United States Patent
Dong et al.

(10) Patent No.: US 9,479,438 B2
(45) Date of Patent: Oct. 25, 2016

(54) LINK AGGREGATION BASED ON VIRTUAL INTERFACES OF VLANS

(71) Applicant: LENOVO ENTERPRISE SOLUTIONS (SINGAPORE) PTE. LTD., Singapore (SG)

(72) Inventors: Xiang Hui Dong, Wuxi (CN); Yuhong Guo, Wuxi (CN); Yun Sun, Wuxi (CN); Zheng Dong Zhu, Wuxi (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 189 days.

(21) Appl. No.: 14/289,338

(22) Filed: May 28, 2014

(65) Prior Publication Data

US 2014/0355445 A1    Dec. 4, 2014

(30) Foreign Application Priority Data

May 31, 2013  (CN) .......................... 2013 1 0211201

(51) Int. Cl.
*H04L 12/803* (2013.01)
*H04L 12/46* (2006.01)
*H04L 12/54* (2013.01)
*H04L 12/70* (2013.01)

(52) U.S. Cl.
CPC .......... *H04L 47/125* (2013.01); *H04L 12/4641* (2013.01); *H04L 12/569* (2013.01); *H04L 2012/568* (2013.01)

(58) Field of Classification Search
USPC ............ 370/235, 237, 231, 230, 230.1, 392, 370/395.53, 402, 468, 401
See application file for complete search history.

(56) References Cited

U.S. PATENT DOCUMENTS

| | | | |
|---|---|---|---|
| 7,336,605 B2 | 2/2008 | Bruckman et al. | |
| 7,664,110 B1 | 2/2010 | Lovett et al. | |
| 7,860,097 B1 | 12/2010 | Lovett et al. | |
| 2010/0054260 A1* | 3/2010 | Pandey | H04L 49/00 370/395.53 |
| 2010/0135307 A1* | 6/2010 | Nakagawa | H04L 49/354 370/395.53 |
| 2012/0294192 A1* | 11/2012 | Masood | H04L 12/4645 370/255 |
| 2013/0022050 A1 | 1/2013 | Leu et al. | |

OTHER PUBLICATIONS

Chen Dong; Link Virtualization in Virtual Routing and Switching Platform, No. 30 Institute of CETC,Chengdu Sichuan 610041,China; Abstract of paper found at URL:http://en.cnki.com.cn/Article_en/CJFDTOTAL-TXJS201107014.htm.

C.J. Sher Decusatis, Aparicio Carranza, Casimer M. Decusatis; Communication Within Clouds: Open Standards and Proprietary Protocols for Data Center Networking; vol. 50, Issue 9, IEEE Magazine, Sep. 2012, pp. 26-33; Abstract found at URL:http://ieeexplore.ieee.org/xpl/login.jsp?tp=&arnumber=6295708&url=http%3A%2F%2Fieeexplore.ieee.org%2Fxpls%2Fabs_all.jsp%3Farnumber%3D6295708.

* cited by examiner

*Primary Examiner* — Edan Orgad
*Assistant Examiner* — Saumit Shah
(74) *Attorney, Agent, or Firm* — Brandon C. Kennedy; Katherine S. Brown; Kennedy Lenart Spraggins LLP

(57) ABSTRACT

A method of managing data transmission based on virtual local area networks includes obtaining a first VLAN property of a first physical interface and a second VLAN property of a second physical interface; in response to determining the first VLAN property and the second VLAN property are at least partially identical, obtaining a first virtual interface corresponding to the first physical interface and a second virtual interface corresponding to the second physical interface; and mapping the first physical interface and the second physical interface to an identical data channel via the first virtual interface and the second virtual interface, wherein the first physical interface and the second physical interface are located in a same processing device.

16 Claims, 8 Drawing Sheets

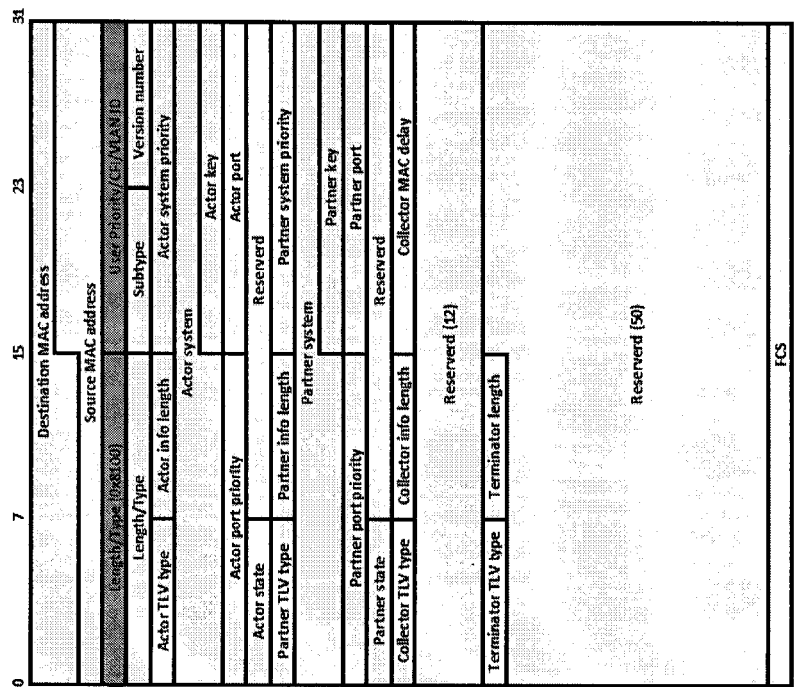
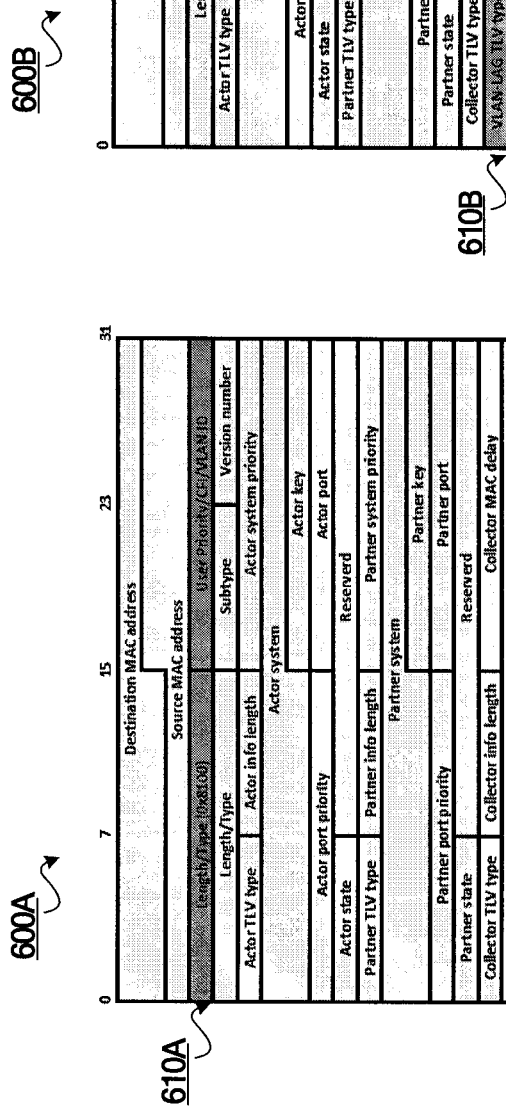
Fig. 6B
Fig. 6A

LINK AGGREGATION BASED ON VIRTUAL INTERFACES OF VLANS

BACKGROUND

Various embodiments of the present invention relate to link aggregation, and more specifically, to a method and apparatus for link aggregation based on virtual interfaces of virtual local area networks (VLANs).

Virtual local area networks are a technology that logically partitions different users in a physical local area network into different broadcast domains, and thus implements data transmission according to virtual work groups.

To improve the data transmission efficiency, link aggregation group (LAG) technology has been developed, which can bind multiple physical interfaces as a logic interface, to properly schedule send/receive traffic among the respective physical interfaces. Although LAG technology can support network transmission traffic balance between multiple physical interfaces, only when VLAN properties of the multiple physical interfaces are completely identical (i.e. the multiple physical interfaces support one or more completely identical VLANs), can the multiple physical interfaces be bound to LAG.

With the development of computer hardware and software technology, virtual machines are applied in increasingly wider scope. A virtual machine refers to a complete computer system that is implemented through software simulation, has a complete range of hardware system functions and runs in a totally isolated environment. Usually one or more virtual machines may run on one physical server, and logically, each exhibits externally the identical processing capability, storage capability and data communication capability as a conventional computer system.

Regarding data communication, a physical machine usually communicates with the outside via hardware means such as a network interface card (NIC). As a virtual machine is logically a computer system, various resources being owned are virtual resources (e.g. a processor, memories, etc.) mapped to real physical resources. It is the same case in the data communication resources, i.e. a virtual machine may have a virtual network interface card (vNIC) that is mapped to a physical NIC on a server, so that the virtual machine can transmit data via the physical NIC on the server and associate it with its own vNIC.

Physical NICs on a server where multiple virtual machines are running may be mapped to multiple vNICs, and these physical NICs may have different VLAN properties (e.g. a physical NIC 1 supports VLANs 10 and 20, while a physical NIC 2 supports VLANs 10 and 30), so physical NICs 1 and 2 cannot be bound to the identical link aggregation group.

Various kinds of applications may run in multiple virtual machines running on a server, and these applications may require different network bandwidths or require no network transmission capability at all. This may lead to transmission load imbalance on physical NICs of the server, and may further result in some NICs in an idle state while others are congested. In face of these problems, research has focused on how to improve data transmission between processing devices (e.g. a switch and a server where multiple virtual machines are running).

Therefore, it is desired to develop, in a processing device supporting virtual local area networks, a technical solution capable of utilizing communication interfaces more effectively, and it is desired to strike a load balance among these communication interfaces and implement data transmission more efficiently.

SUMMARY

According to one aspect of the invention, there is provided a method of managing data transmission based on virtual local area networks, comprising: obtaining a first VLAN property of a first physical interface and a second VLAN property of a second physical interface; in response to determining the first VLAN property and the second VLAN property are at least partially identical, obtaining a first virtual interface corresponding to the first physical interface and a second virtual interface corresponding to the second physical interface; and mapping the first physical interface and the second physical interface to an identical data channel via the first virtual interface and the second virtual interface, wherein the first physical interface and the second physical interface are located in a same processing device.

According to one aspect of the invention, there is provided an apparatus for managing data transmission based on virtual local area networks, comprising: a first obtaining module configured to obtain a first VLAN property of a first physical interface and a second VLAN property of a second physical interface; a second obtaining module configured to obtain, in response to determining the first VLAN property and the second VLAN property are at least partially identical, a first virtual interface corresponding to the first physical interface and a second virtual interface corresponding to the second physical interface; and a mapping module configured to map the first physical interface and the second physical interface to an identical data channel via the first virtual interface and the second virtual interface, wherein the first physical interface and the second physical interface are located in a same processing device.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure. In the drawings, FIG. 1 schematically illustrates a block diagram of an exemplary computer system which is applicable to implement the embodiments of the invention;

FIGS. 6A and 6B each schematically illustrate a format of a negotiation message according to one embodiment of the invention;

DETAILED DESCRIPTION

Figure 1:
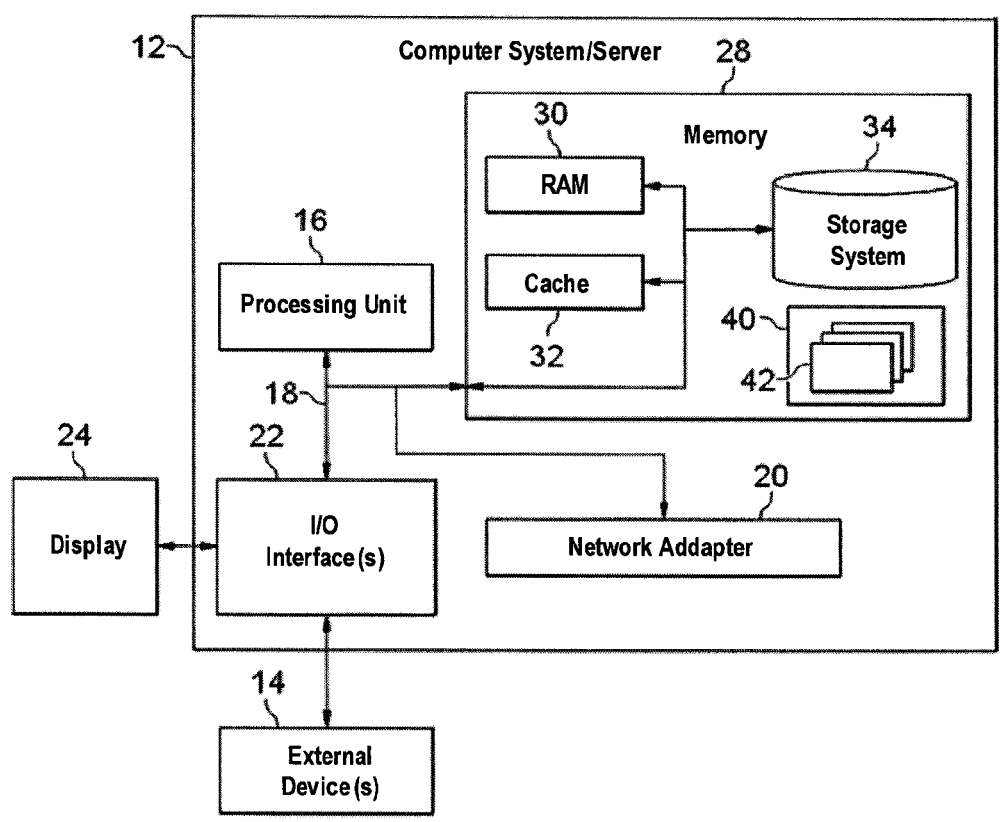

According to one aspect of the invention, the first VLAN property and the second VLAN property at least describe at least one virtual local area network supported by the first physical interface and the second physical interface, respectively.

According to one aspect of the invention, the first physical interface may be mapped to multiple data channels.

According to one aspect of the invention, the processing device is at least one server; or the processing device is at least one switch.

By means of the technical solutions described by the various embodiments of the invention, interfaces supporting different VLANs may be aggregated to the identical data channel, and subsequently data is transmitted through the data channel. In this manner, on the one hand strict requirements of on communication interface properties in existing LAG technology may be lowered, and on the other hand, data transmission capabilities of various communication interfaces may be utilized more effectively, e.g. load balance is stricken among various communication interfaces and further data transmission is implemented more efficiently.

Some exemplary embodiments will be described in more detail with reference to the accompanying drawings, in which the exemplary embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, in some embodiments, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electromagnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is illustrated. Computer system/server 12 illustrated in FIG. 1 is only illustrative and is not intended to suggest any limitation as to the scope of use or functionality of embodiments of the invention described herein.

As illustrated in FIG. 1, computer system/server 12 is illustrated in the form of a general-purpose computing device. The components of computer system/server 12 may include, but are not limited to, one or more processors or processing units 16, a system memory 28, and a bus 18 that couples various system components including the system memory 28 and processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not illustrated in FIG. 1 and typically called a "hard drive"). Although not illustrated in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
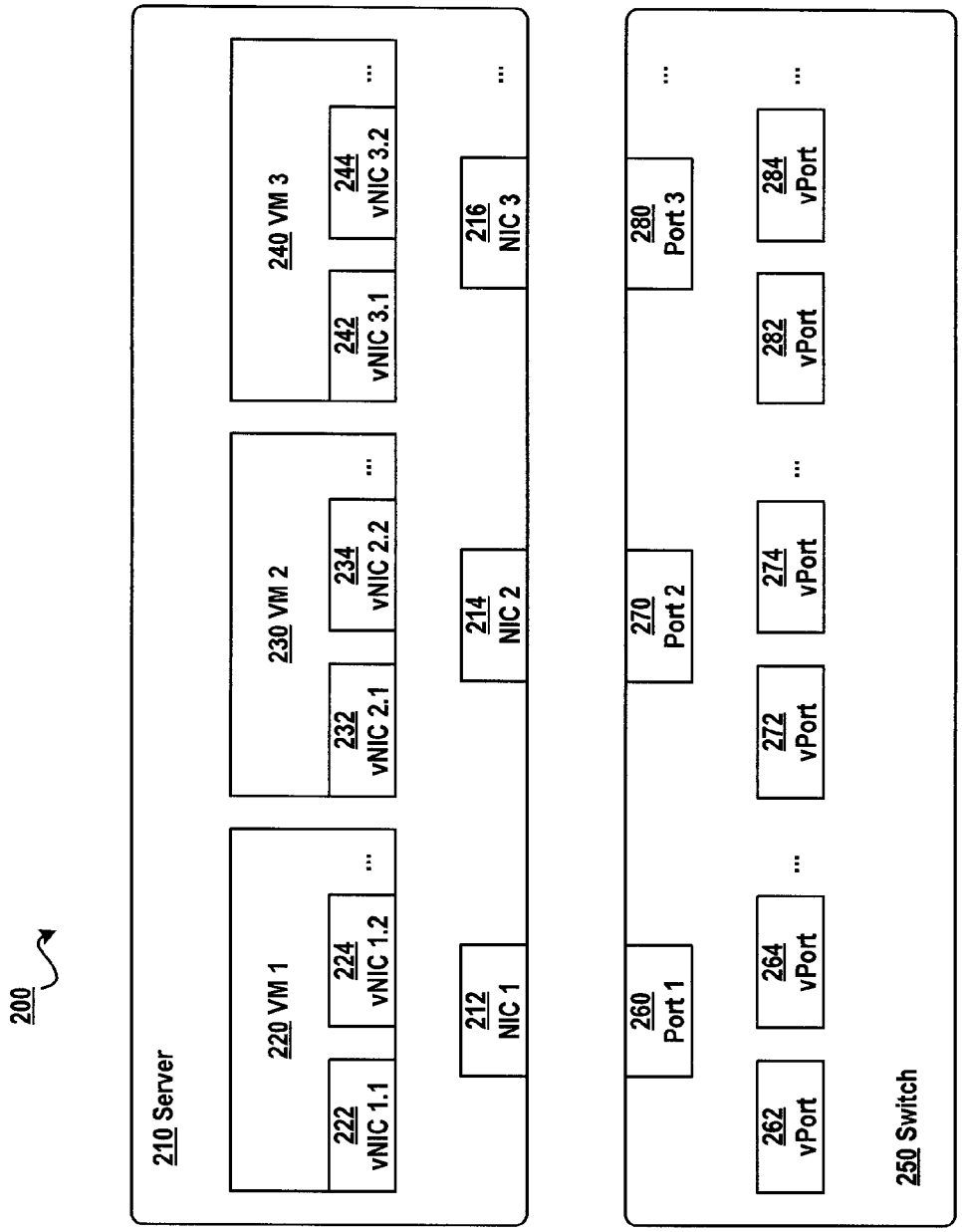
FIG. 2 schematically illustrates a block diagram of interfaces in a processing device according to one embodiment of the invention.

FIG. 2 schematically illustrates a block diagram 200 of interfaces in a processing device according to one embodiment of the present invention. In the context of the present invention, the processing device may be, for example, a server 210 or a switch 250. A plurality of virtual machines may be running on server 210, such as a virtual machine 1 220, a virtual machine 2 230, a virtual machine 3 240, etc. Server 210 may have a plurality of physical interfaces, such as a NIC 1 212, a NIC 2 214, a NIC 3 216, etc. In the meanwhile, each virtual machine may have one or more vNICs; for example, virtual machine 1 220 may have a vNIC 1.1 222, a vNIC 1.2 224, etc. The server's physical NICs may be mapped to one or more vNICs of one or more virtual machines.

Switch 250 may have a plurality of physical ports, such as a port 1 260, a port 2 270, a port 3 280, etc. Similarly, the switch may further have a plurality of virtual ports, such as virtual ports 262, 264, . . . , 284, etc. Like the mapping relationship among NICs in the server, in the switch one physical port may be mapped to one or more virtual ports. In the context of the present invention, NICs in the server and ports in the switch may be referred to as interfaces. During data transmission, positions of a NIC and a port correspond to each other.

A complex mapping relationship may exist between physical interfaces and virtual interfaces, because existing LAG technology does not support aggregating physical interfaces with different VLAN properties to the identical group. Based on this drawback, a technical solution called "teaming" has been proposed. Teaming, which is applied only at the server side, can bind a plurality of vNICs to one logic channel in which balanced load transmission is implemented between physical interfaces corresponding to the plurality of vNICs.

Although teaming can strike a load balance and improve the data transmission efficiency to some extent, the technology's various transmission modes contain a number of drawbacks. For example, in an active backup mode, a backup NIC is standby, so only half the network bandwidth is used; in a transmit load balance mode, effective load balance cannot be stricken in the receiving direction; additionally, in an adaptive load balance mode, data traffic received from the gateway cannot be load-balanced.

To this end, various embodiments of the present invention provide a method of managing data transmission based on virtual local area networks, comprising: obtaining a first VLAN property of a first physical interface and a second VLAN property of a second physical interface; in response to determining the first VLAN property and the second VLAN property are at least partially identical, obtaining a first virtual interface corresponding to the first physical interface, and a second virtual interface corresponding to the second physical interface; and mapping the first physical interface and the second physical interface to the identical data channel via the first virtual interface and the second virtual interface, wherein the first physical interface and the second physical interface are located in the same processing device. A physical interface's VLAN property at least indicates a virtual local area network supported by the physical interface. Those skilled in the art may further design other contents of VLAN properties.

Figure 3:
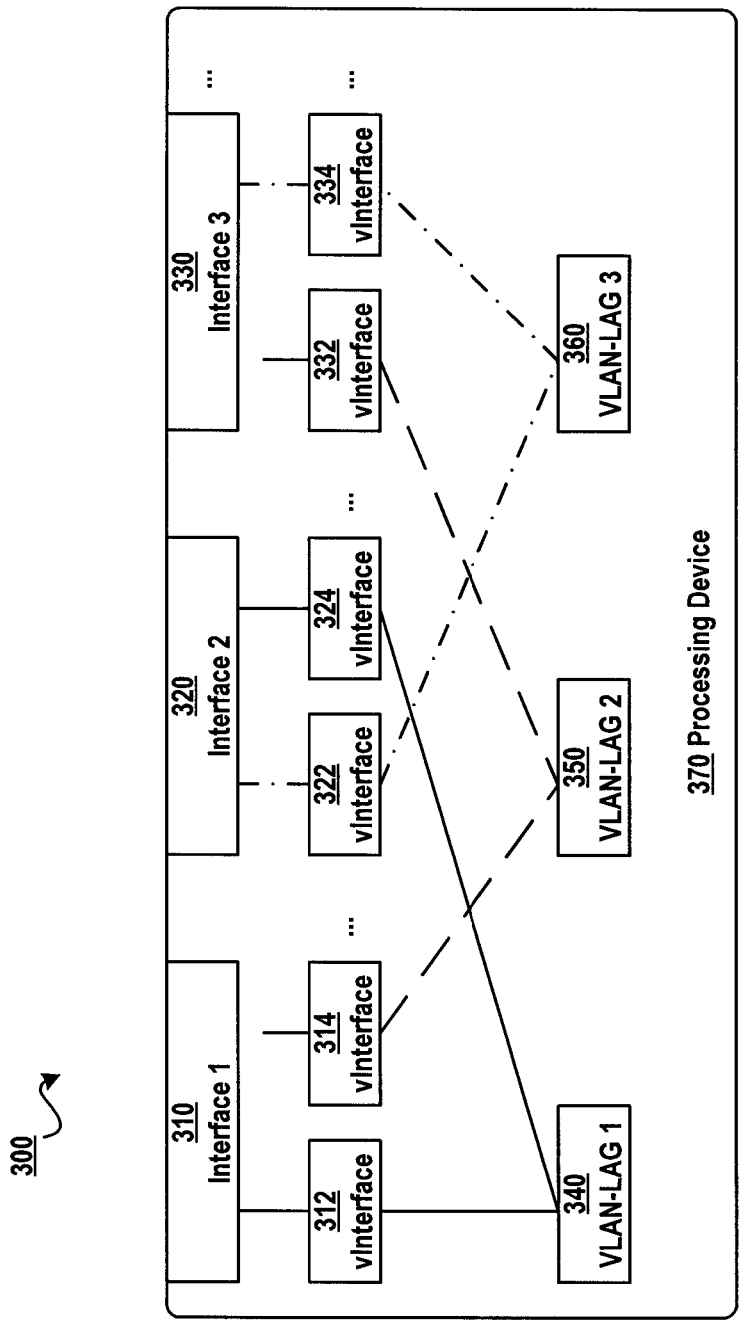
FIG. 3 schematically illustrates an architecture diagram of managing data transmission based on virtual local area networks according to one embodiment of the invention.

Now with reference to FIG. 3, detailed description is presented to principles of the present invention. FIG. 3 schematically illustrates an architecture diagram 300 of managing data transmission based on virtual local area networks. A processing device 370 may comprise a plurality of physical interfaces, such as an interface 1 310, an interface 2 320, an interface 3 330, etc. Each physical interface may be mapped to a plurality of virtual interfaces; for example, interface 1 310 may be mapped to virtual interfaces 312, 314, etc. Moreover, each physical interface may support different VLANs; for example, interface 1 310 may support VLANs 10 and 20, while interface 2 320 may support VLANs 10 and 30. Specifically, a VLAN property of a respective interface may be described using Table 1 below.

TABLE 1

Interface's VLAN Property

| No. | Interface ID | VLAN Property |
| --- | --- | --- |
| 1 | interface 1 | VLAN 10, VLAN 20 |
| 2 | interface 2 | VLAN 10, VLAN 30 |
| 3 | interface 3 | VLAN 20, VLAN 30 |

According to the existing LAG, since VLAN properties of interface 1 310 and interface 2 320 are not completely identical, these two interfaces cannot be aggregated to the identical group. According to the principles of the present invention, as long as VLAN properties of two interfaces are partially identical, the two interfaces may be mapped to the identical data channel. In the context of the present invention, the data channel may be referred to as a virtual local area network link aggregation group (VLAN-LAG). In one embodiment of the present invention, a VLAN-LAG may be specified using a unique identifier, and with respect to a specific VLAN-LAG, bandwidth resources of various interfaces may be scheduled as a whole, thereby striking load balance and improving the data transmission capability.

Specifically, in FIG. 3, although VLAN properties of interface 1 310 and interface 2 320 are not completely identical, both of the two interfaces support VLAN 10. Based on the technical solution of the present invention, the two interfaces may be mapped to a VLAN-LAG 1 340 (as shown by solid lines between reference numerals 310-312-340, 320-324-340). For another example, based on above Table 1, since both interfaces 2 320 and 3 330 support VLAN 30, they may be mapped to a VLAN-LAG 3 360 (as shown by dash-dotted lines between reference numerals 320-322-360, 330-334-360). Further, since both interfaces 1 310 and 3 330 support VLAN 20, they may be mapped to a VLAN-LAG 2 350 (as shown by dashed lines between reference numerals 310-314-350, 330-332-350).

Note the type of processing device 370 is not specified in FIG. 3. Those skilled in the art may understand processing device 370 may be a server or a switch based on different embodiments.

Figure 4:
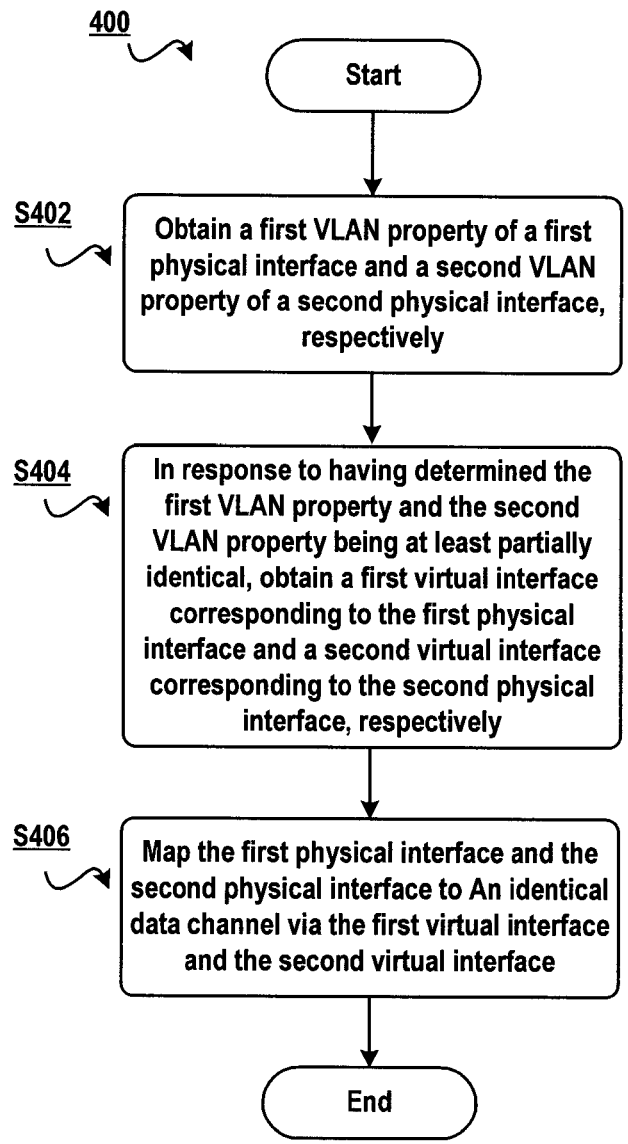
FIG. 4 schematically illustrates a flowchart of a method of managing data transmission based on virtual local area networks according to one embodiment of the invention.

With reference to FIG. 4, detailed description is presented below to steps of a method according to the present invention. FIG. 4 schematically illustrates a flowchart 400 of a method of managing data transmission based on virtual local area networks according to one embodiment of the present invention. First of all, in step S402 a first VLAN property of a first physical interface and a second VLAN property of a second physical interface are obtained respectively, wherein the first physical interface and the second physical interface are located in the same processing device. In this embodiment, where the processing device is a server, the first physical interface and the second physical interface each may be NICs; where the processing device is a switch, the first physical interface and the second physical interface may be ports.

Note the VLAN property of a respective physical interface may be kept at the processing device (e.g. saved in the format as shown in above Table 1). Thus, the VLAN property of the respective physical interface may be determined by reading Table 1. Specifically, it may be determined from Table 1 that VLAN properties of the first physical interface (interface 1) and the second physical interface (interface 2) are (VLAN 10, VLAN 20) and (VLAN 10, VLAN 30), respectively.

In step S404, in response to having determined the first VLAN property and the second VLAN property being at least partially identical, a first virtual interface corresponding to the first physical interface and a second virtual interface corresponding to the second physical interface are obtained respectively. Continue the foregoing example. In the step of judging, when the first VLAN property and the second VLAN property are (VLAN 10, VLAN 20) and (VLAN 10, VLAN 30) respectively, it can be determined that the two VLAN properties include VLAN 10, so they are at least partially identical and then the operational flow proceeds to step S406.

Subsequently, in response to a judgment result being "Yes," a first virtual interface corresponding to the first physical interface and a second virtual interface corresponding to the second physical interface may be obtained respectively. Since correspondences between physical interfaces and virtual interfaces are known, virtual interfaces corresponding to various physical interfaces may be obtained. Continuing the foregoing example and with reference to FIG. 3, the first virtual interface (virtual interface 312) of the first physical interface and the second virtual interface (virtual interface 324) of the second physical interface may be obtained.

In step S406, the first physical interface and the second physical interface are mapped to the identical data channel via the first virtual interface and the second virtual interface. Corresponding to the LAG technology in the prior art, the step of "mapping" here may refer to binding the first physical interface and the second physical interface to a data channel (VLAN-LAG). In this data channel, network bandwidths of various physical interfaces may be scheduled in a uniform manner, so as to improve the data transmission efficiency. Continuing the foregoing example and with reference to FIG. 3, first interface 1 310 and second interface 2 320 may be mapped to VLAN-LAG 1 340 (as shown by solid lines between reference numerals 310-312-340, 320-324-340) via virtual interface 312 and virtual interface 324.

In one embodiment of the present invention, the first VLAN property and the second VLAN property at least describes at least one virtual local area network supported by the first physical interface and the second physical interface, respectively. The various embodiments of the present invention do not limit whether the first VLAN property and the second VLAN property are completely identical or not. For example, the first VLAN property and the second VLAN property may be completely identical, and one may be a subset of the other, etc., so long as they have an intersection.

Note when the first VLAN property and the second VLAN property are completely identical, although based on the existing LAG technology the first physical interface and the second physical interface may be mapped to the identical LAG, the existing LAG technology can only map the first physical interface to one LAG together with other physical interfaces with a completely identical VLAN property, but cannot map one physical interface to a plurality of different LAGs.

In one embodiment of the present invention, the first physical interface may be mapped to a plurality of data channels. In the context of the present invention, since such two factors as a physical interface and VLANs supported by the physical interface are considered when building a data channel, one physical interface (e.g. first physical interface) may be mapped to a plurality of data channels. As illustrated in FIG. 3, at the processing device interface 1 310 is mapped to two data channels VLAN-LAG 1 340 and VLAN-LAG 2 350 respectively. By mapping one physical interface to different data channels, it is more helpful to strike a load balance between a plurality of physical interfaces and provide data transmission with more flexibility and reliability.

Figure 5:
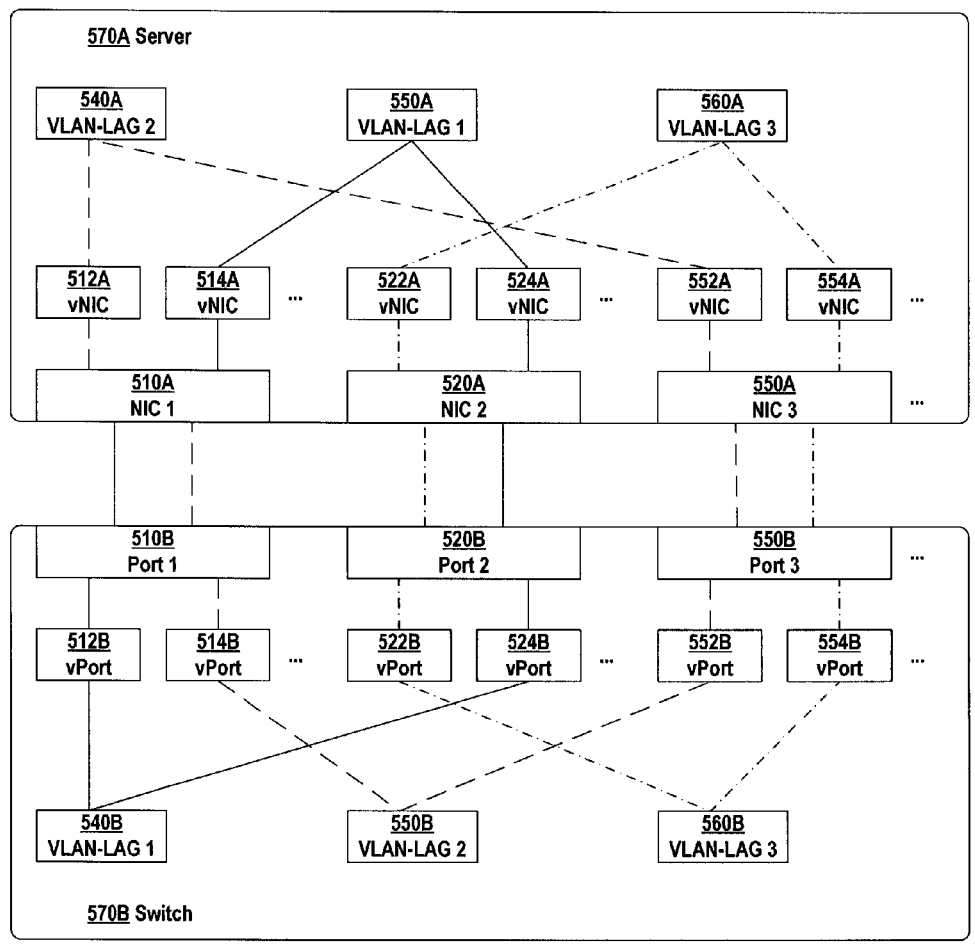
FIG. 5 schematically illustrates an architecture diagram of transmitting data based on virtual local area network link aggregation groups (VLAN-LAGs) according to one embodiment of the invention.

Reference has been made to FIGS. 3 and 4 above to illustrate how to implement the technical solution of the present invention at a processing device. Now with reference to FIG. 5, illustration is presented to how to transmit data through a data channel between a server and a switch. Specifically, FIG. 5 schematically illustrates an architecture diagram 500 of transmitting data based on a virtual local area network link aggregation group according to one embodiment of the present invention.

As illustrated in FIG. 5, data may be transmitted between a server 570A and a switch 570B through a data channel (VLAN-LAG 1). As shown by solid lines in FIG. 5, VLAN-LAG 1 may comprise two transmission paths: 514A-510A-510B-512B and 524A-520A-520B-524B. By means of VLAN-LAG 1, a load balance may be stricken between physical interfaces of server 570A and switch 570B. Similarly, FIG. 5 further illustrates a VLAN-LAG 2 (as illustrated by dashed lines) and a VLAN-LAG 3 (as illustrated by dash-dotted lines).

In one embodiment of the present invention, the obtaining a first VLAN property of a first physical interface and a second VLAN property of a second physical interface respectively comprises: reading from a configuration file in the processing device the first VLAN property and the second VLAN property. A configuration file as shown in Table 1 above may be kept in the processing device, from which information required for establishing a data channel may be obtained. Alternatively, the configuration file may further comprise other information, e.g. comprise a unique identifier allocated to a data channel in advance, etc.

In the context of the present invention, a data channel may be dynamically established using extended Link Aggregation Control Protocol (LACP) messages during data transmission. For example, in one embodiment of the present invention, the obtaining a first VLAN property of a first physical interface and a second VLAN property of a second physical interface respectively comprises: parsing negotiation messages transmitted through the first physical interface and the second physical interface so as to obtain the first VLAN property and the second VLAN property respectively.

Specifically, FIGS. 6A and 6B schematically illustrate schematic views 600A and 600B of a negotiation message according to one embodiment of the present invention, respectively. VLAN properties of a physical interface (i.e. identifiers of VLANs supported by the physical interface) may be inserted into different locations of the message. As illustrated in FIG. 6A, an identifier of a supported VLAN may be inserted into the field "VLAN ID" in the message as shown by a reference numeral 610A, or an identifier of a supported VLAN may be inserted into the field "VLAN ID" in the message as shown by a reference numeral 610B. Alternatively, those skilled in the art may insert an identifier of a supported VLAN into other location in the message, so long as the processing device can learn the concrete location of the inserted identifier and parse the identifier therefrom.

In one embodiment of the present invention, the mapping the first physical interface and the second physical interface to the identical data channel via the first virtual interface and the second virtual interface comprises: transmitting data between the processing device and another processing device through the data channel according to a mapping table, wherein the mapping table saves a mapping relationship among a physical interface, a VLAN property of the physical interface and a data channel.

TABLE 2

Mapping Table

| Interface ID | VLAN ID | VLAN-LAG ID |
|---|---|---|
| 1 | 1000 | 10000 |
| 1 | 1001 | 10001 |
| 2 | 1000 | 10000 |
| 3 | 1001 | 10001 |
| ... | ... | ... |

Note in the embodiments of the present invention, since the first physical interface and the second physical interface are mapped to the identical data channel only when the first VLAN property and the second VLAN property are at least partially identical, interfaces with the identical VLAN-LAG IDs shown in Table 2 above support an identical VLAN ID.

In the mapping table shown in Table 2, the column Interface ID records an identifier of a hardware interface, the column VLAN ID records an identifier of a VLAN supported by a certain interface ID, and the column VLAN-LAG ID records an identifier of a VLAN-LAG corresponding to a hardware interface ID and supported VLAN ID.

Figure 7:
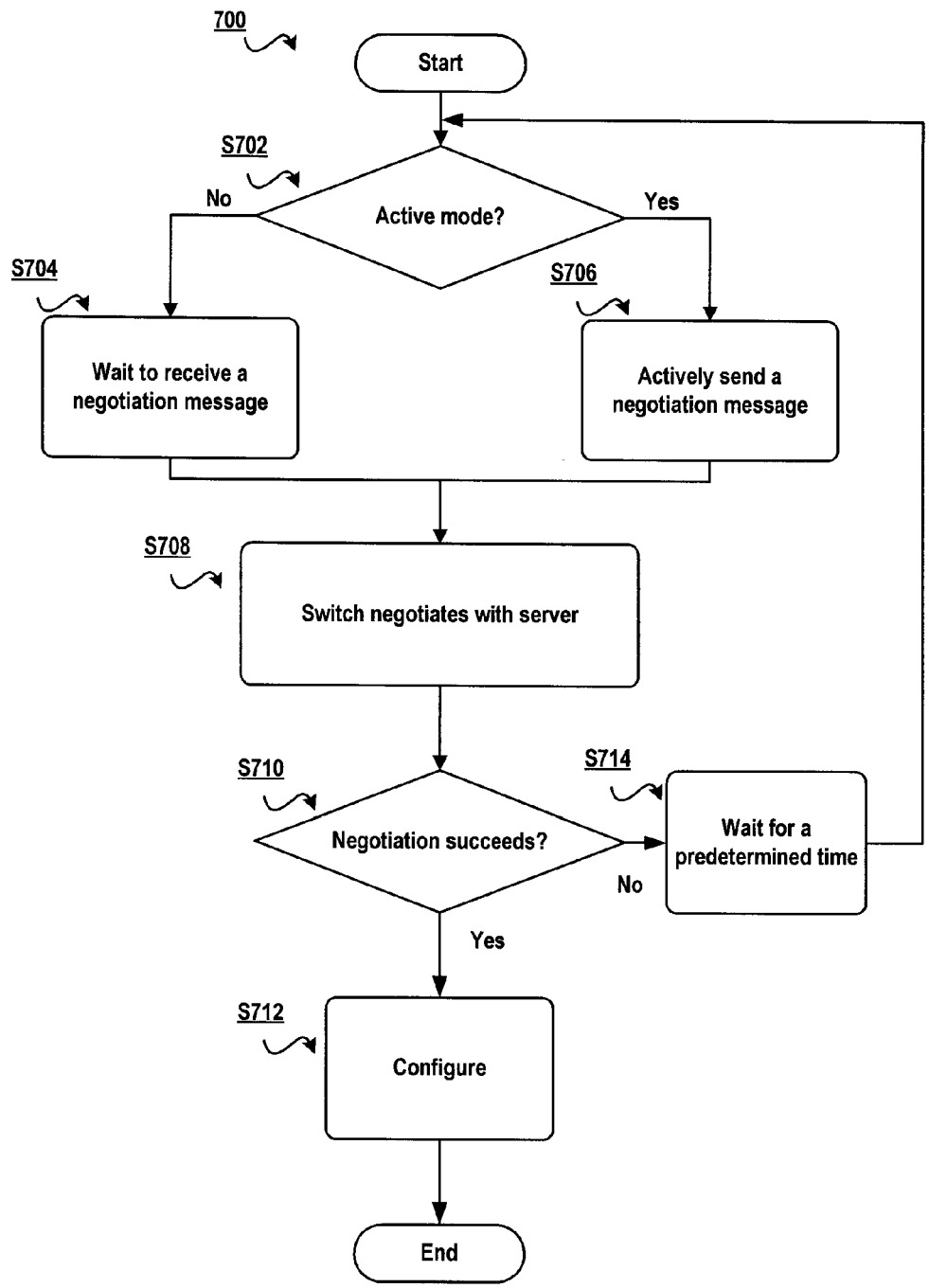
FIG. 7 schematically illustrates a flowchart of a method of negotiating VLAN-LAG identifier according to one embodiment of the invention.

FIG. 7 schematically illustrates a flowchart 700 of a method for negotiating about a VLAN-LAG identifier. In the context of the present invention, a negotiation mode may be set as an active mode or a passive mode according to concrete demands. The active mode refers to the processing device sends a negotiation message actively, while the passive mode refers to the processing device should not send a negotiation message actively, but has to wait to receive a negotiation message sent by other processing device.

As illustrated in FIG. 7, in step S702 if the processing device is in the active mode, the operational flow proceeds to step S706, or else the operational flow proceeds to step S704. Subsequently, in step S708 the switch and the server negotiate to establish a data channel. In step S710, when the negotiation succeeds, the data channel is configured according to negotiated content in step S712, or else the operational flow proceeds to step S714 and after waiting for a predetermined time, returns to step S702 for re-negotiation.

In one embodiment of the present invention, there is further comprised: dynamically updating the mapping table according to negotiation packets sent to and from the processing device. In the processing device there may be stored a VLAN-LAG ID management table as shown in Table 3, wherein the column "usage status" "0" indicates a corresponding VLAN-ID has not been used yet while "1" indicates a corresponding VLAN-ID has been used. Table 3 shows a VLAN-LAG ID management table in the initial phase, at which point none of VLAN-LAG IDs has been used.

TABLE 3

VLAN-LAG ID Management Table

| Usage Status | VLAN-LAG ID |
|---|---|
| 0 | 10000 |
| 0 | 10001 |
| 0 | 10002 |
| 0 | 10003 |
| 0 | ... |

Detailed description will be presented below to the negotiation process. Suppose the processing device is configured as the active negotiation mode and interface 1 supports VLAN ID 1000, then the processing device can initiate negotiation first. Upon receiving a negotiation message, another processing device can check its own configuration and send a negotiation message carrying VLAN ID 1000. After both parties make confirmation, the negotiation succeeds, at which point an appropriate VLAN-LAG ID may be searched in the VLAN-LAG ID management table. For example, it is learned by looking up Table 3 that VLAN-LAG ID "10000" has not been used, then a mapping relationship may be established among interface 1, VLAN 1000 and VLAN-LAG ID 10000.

After establishing the mapping relationship, VLAN-LAG ID 10000 has been used in interface 1 supporting VLAN ID 1000; at this point, the VLAN-LAG ID management table and the mapping table are dynamically updated, and updated contents are as shown in Table 4 and Table 5, respectively.

TABLE 4

VLAN-LAG ID Management Table

| Usage Status | VLAN-LAG ID |
|---|---|
| 1 | 10000 |
| 0 | 10001 |
| 0 | 10002 |
| 0 | 10003 |
| 0 | ... |

TABLE 5

Mapping Table

| Interface ID | VLAN ID | VLAN-LAG ID |
|---|---|---|
| 1 | 1000 | 10000 |
| 1 | 1001 | 0 |
| 2 | 1000 | 0 |
| 3 | 1001 | 0 |
| ... | ... | ... |

Suppose interface 1 further supports VLAN 1001, then after the negotiation ends, with respect to interface 1, VLAN 1001 may be mapped to VLAN-LAG ID 10001 based on the above method. At this point, the VLAN-LAG ID management table and the mapping table are dynamically updated, and updated contents are as shown in Table 6 and Table 7, respectively.

TABLE 6

VLAN-LAG ID Management Table

| Usage Status | VLAN-LAG ID |
|---|---|
| 1 | 10000 |
| 1 | 10001 |
| 0 | 10002 |
| 0 | 10003 |
| 0 | ... |

TABLE 7

Mapping Table

| Interface ID | VLAN ID | VLAN-LAG ID |
|---|---|---|
| 1 | 1000 | 10000 |
| 1 | 1001 | 10001 |
| 2 | 1000 | 0 |
| 3 | 1001 | 0 |
| ... | ... | ... |

Those skilled in the art may further operate according to similar methods until obtaining the mapping table as shown in Table 2.

In one embodiment of the present invention, the transmitting data between the processing device and another processing device through the data channel according to a mapping table comprises: in response to having received, on either of the first physical interface and the second physical interface, a packet from the another processing device, searching a data channel corresponding to the packet based on the mapping table; and guiding the packet to a virtual interface associated with the found data channel.

A corresponding VLAN-LAG ID may be searched in the mapping table based on an identifier of a physical interface and an identifier of a supported VLAN. For example, when the mapping table as shown in Table 2 above is adopted, when the interface ID is "interface 1," the supported VLAN ID is 1000, then VLAN-LAG ID 10000 may be determined Based on the correspondence between a physical interface and a virtual interface when establishing VLAN-LAG 10000, the packet may be guided to a virtual interface associated with the found data channel.

In one embodiment of the present invention, when data is sent through the data channel, the transmitting data between the processing device and another processing device through the data channel according to a mapping table comprises: based on the mapping table, selecting at least any one physical interface associated with the data channel; and sending data from the processing device to the another processing device through the at least any one physical interface.

When data is sent through a data channel, first all interface corresponding to the data channel may be obtained based on the mapping table, and subsequently an appropriate interface is selected by, e.g. hash algorithm and data is sent through the interface. For example, still take the mapping table shown in Table 2 as an example. When data is sent through VLAN-LAG ID 10000, an interface (e.g. interface 1) may be selected from interface 1 and interface 2 associated with VLAN-LAG ID 10000 by using a specific algorithm, and then data is sent through the interface. At this point, VLAN-LAG ID is a lookup key.

In one embodiment of the present invention, the processing device is at least one server; or the processing device is at least one switch. Note in the context of the present invention it is not intended to limit whether the first physical interface and the second physical interface locate on the identical or different servers, or further locate on the identical or different switches, so long as these physical interfaces are locate on the same type of processing device.

In the context of the present invention, the processing device may be any of a server and a switch. Accordingly, when the processing device is a server, the first physical interface and the second physical interface may be NICs in the server; when the processing device is a switch, the first physical interface and the second physical interface may be ports in the switch. Although the technical solution of the present invention has been described by only taking the processing device and interfaces as an example, those skilled in the art may understand the technical solution of the present invention may be embodied as concrete examples under different application environments.

Figure 8:
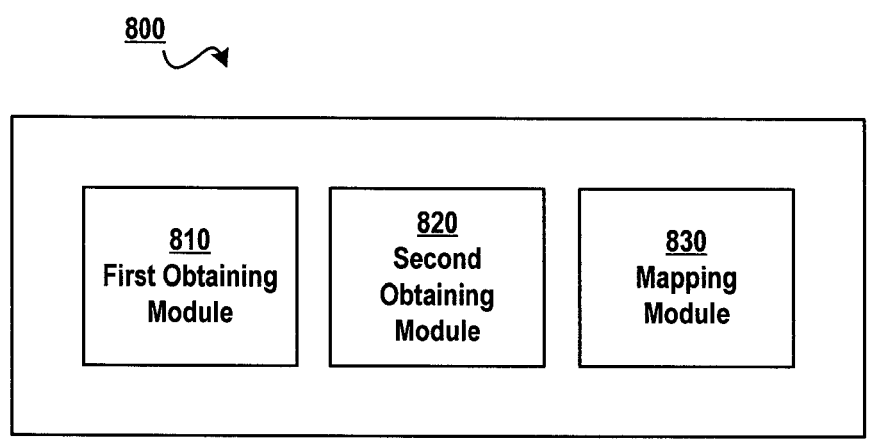
FIG. 8 schematically illustrates a block diagram of an apparatus for managing data transmission based on virtual local area networks according to one embodiment of the invention.

FIG. 8 schematically illustrates a block diagram 800 of an apparatus for managing data transmission based on virtual local area networks according to one embodiment of the present invention. Specifically, there is provided an apparatus for managing data transmission based on virtual local area networks, comprising: a first obtaining module 810 configured to obtain a first VLAN property of a first physical interface and a second VLAN property of a second physical interface, respectively; a second obtaining module 820 configured to obtain, in response to having determined the first VLAN property and the second VLAN property being at least partially identical, a first virtual interface corresponding to the first physical interface and a second virtual interface corresponding to the second physical interface, respectively; and a mapping module 830 configured to map the first physical interface and the second physical interface to an identical data channel via the first virtual interface and the second virtual interface, wherein the first physical interface and the second physical interface are located in a same processing device.

In one embodiment of the present invention, the first VLAN property and the second VLAN property at least describe at least one virtual local area network supported by the first physical interface and the second physical interface, respectively.

In one embodiment of the present invention, the first physical interface may be mapped to multiple data channels.

In one embodiment of the present invention, first obtaining module 810 comprises: a reading module configured to read from a configuration file in the processing device the first VLAN property and the second VLAN property.

In one embodiment of the present invention, first obtaining module 810 comprises: a parsing module configured to parse negotiation messages transmitted through the first physical interface and the second physical interface so as to obtain the first VLAN property and the second VLAN property respectively.

In one embodiment of the present invention, mapping module 830 comprises: a transmitting module configured to transmit data between the processing device and another processing device through the data channel according to a mapping table, wherein the mapping table saves a mapping relationship among a physical interface, a VLAN property of the physical interface and a data channel.

In one embodiment of the present invention, the transmitting module comprises: a lookup module configured to, in response to receiving, on either of the first physical interface and the second physical interface, a packet from the another processing device, search a data channel corresponding to the packet based on the mapping table; and a guiding module configured to guide the packet to a virtual interface associated with the found data channel.

In one embodiment of the present invention, the transmitting module further comprises: a selecting module configured to when data is sent through the data channel, select at least any one physical interface associated with the data channel based on the mapping table; and a sending module configured to send data from the processing device to the another processing device through the at least any one physical interface.

In one embodiment of the present invention, there is further comprised: an updating module configured to dynamically update the mapping table according to negotiation packets sent to and from the processing device.

In one embodiment of the present invention, the processing device is at least one server; or the processing device is at least one switch.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of managing data transmission based on virtual local area networks, comprising:
   obtaining a first VLAN property of a first physical interface and a second VLAN property of a second physical interface;
   in response to determining that the first VLAN property and the second VLAN property are at least partially identical, obtaining a first virtual interface corresponding to the first physical interface and a second virtual interface corresponding to the second physical interface, wherein the first VLAN property and the second VLAN property at least describe at least one first virtual local area network supported by the first physical interface and the second physical interface, respectively, and at least another virtual local area network supported by the first physical interface is different from at least another virtual local area network supported by the second physical interface; and mapping the first physical interface and the second physical interface to an identical data channel via the first virtual interface and the second virtual interface, wherein the first physical interface and the second physical interface are located in a same processing device.

2. The method according to claim 1, wherein obtaining a first VLAN property of a first physical interface and a second VLAN property of a second physical interface comprises: reading from a configuration file in the processing device the first VLAN property and the second VLAN property.

3. The method according to claim 1, wherein obtaining a first VLAN property of a first physical interface and a second VLAN property of a second physical interface comprises: parsing negotiation messages transmitted through the first physical interface and the second physical interface to obtain the first VLAN property and the second VLAN property.

4. The method according to claim 1, wherein mapping the first physical interface and the second physical interface to the identical data channel via the first virtual interface and the second virtual interface comprises: transmitting data between the processing device and another processing device through the data channel according to a mapping table, wherein the mapping table saves a mapping relationship among a physical interface, a VLAN property of the physical interface and a data channel.

5. The method according to claim 4, wherein transmitting data between the processing device and another processing device through the data channel according to a mapping table comprises:
 in response to having received, on either of the first physical interface and the second physical interface, a packet from the another processing device, determining a data channel corresponding to the packet based on the mapping table; and
 guiding the packet to a virtual interface associated with the determined data channel.

6. The method according to claim 4, wherein transmitting data between the processing device and another processing device through the data channel determined based on the mapping table comprises:
 when data is sent through the data channel, selecting at least one physical interface associated with the data channel based on the mapping table; and
 sending data from the processing device to the another processing device through the at least one physical interface.

7. The method according to claim 6, further comprising: dynamically updating the mapping table according to negotiation packets sent to and from the processing device.

8. The method according to claim 1, wherein the processing device is at least one server; or the processing device is at least one switch.

9. An apparatus comprising a processor and a non-transitory computer storage medium, the non-transitory computer storage medium including computer program instructions that when executed by the processor cause the processor to:
 obtain a first VLAN property of a first physical interface and a second VLAN property of a second physical interface;
 obtain, in response to determining the first VLAN property and the second VLAN property are at least partially identical, a first virtual interface corresponding to the first physical interface and a second virtual interface corresponding to the second physical interface, wherein the first VLAN property and the second VLAN property at least describe at least one first virtual local area network supported by the first physical interface and the second physical interface, respectively, and at least another virtual local area network supported by the first physical interface is different from at least another virtual local area network supported by the second physical interface; and
 map the first physical interface and the second physical interface to an identical data channel via the first virtual interface and the second virtual interface,
 wherein the first physical interface and the second physical interface are located in a same processing device.

10. The apparatus according to claim 9, wherein obtain the first VLAN property of the first physical interface and the second VLAN property of the second physical interface further comprises to read from a configuration file in the processing device the first VLAN property and the second VLAN property.

11. The apparatus according to claim 9, wherein obtain the first VLAN property of the first physical interface and the second VLAN property of the second physical interface further comprises to parse negotiation messages transmitted through the first physical interface and the second physical interface to obtain the first VLAN property and the second VLAN property respectively.

12. The apparatus according to claim 9, wherein map the first physical interface and the second physical interface to an identical data channel via the first virtual interface and the second virtual interface further comprises to transmit data between the processing device and another processing device through a data channel, the data channel determined according to a mapping table, wherein the mapping table saves a mapping relationship among a physical interface, a VLAN property of the physical interface and a data channel.

13. The apparatus according to claim 12, wherein transmit data between the processing device and another processing device through a data channel further comprises:
 in response to having received, on either of the first physical interface and the second physical interface, a packet from the another processing device, to determine a data channel corresponding to the packet based on the mapping table; and
 to guide the packet to a virtual interface associated with the determined data channel.

14. The apparatus according to claim 12, wherein to transmit data between the processing device and another processing device through a data channel further comprises:
 when data is sent through the data channel, to select at least one physical interface associated with the data channel based on the mapping table; and
 to send data from the processing device to the another processing device through the at least one physical interface.

15. The apparatus according to claim 12, further comprising dynamically update the mapping table according to negotiation packets sent to and from the processing device.

16. The apparatus according to claim 9, wherein the processing device is at least one server; or the processing device is at least one switch.

* * * * *